(12) United States Patent
Harasin et al.

(10) Patent No.: US 9,757,905 B2
(45) Date of Patent: Sep. 12, 2017

(54) FILAMENT WINDING PROCESSES USING POLYURETHANE RESINS AND SYSTEMS FOR MAKING COMPOSITES

(71) Applicant: Covestro LLC, Pittsburgh, PA (US)

(72) Inventors: Stephen J. Harasin, Morgan, PA (US); Gene Symosko, Oakdale, PA (US); Albert Magnotta, Monaca, PA (US)

(73) Assignee: Covestro LLC, Pittsburgh, PA (US)

( * ) Notice: Subject to any disclaimer, the term of this patent is extended or adjusted under 35 U.S.C. 154(b) by 254 days.

(21) Appl. No.: 14/708,538

(22) Filed: May 11, 2015

(65) Prior Publication Data

US 2016/0332390 A1 Nov. 17, 2016

(51) Int. Cl.

| | | |
|---|---|---|
| *B29C 70/30* | (2006.01) |
| *B29C 70/16* | (2006.01) |
| *C08G 18/50* | (2006.01) |
| *C08G 18/76* | (2006.01) |
| *C08J 5/24* | (2006.01) |
| *C08G 18/36* | (2006.01) |
| *C08G 18/48* | (2006.01) |
| *B29C 70/52* | (2006.01) |
| *B29C 70/54* | (2006.01) |
| *B29C 70/32* | (2006.01) |
| *B29K 75/00* | (2006.01) |
| *B29K 105/00* | (2006.01) |
| *B29K 511/00* | (2006.01) |

(52) U.S. Cl.
CPC .............. *B29C 70/30* (2013.01); *B29C 70/16* (2013.01); *B29C 70/32* (2013.01); *B29C 70/521* (2013.01); *B29C 70/546* (2013.01); *C08G 18/36* (2013.01); *C08G 18/482* (2013.01); *C08G 18/5024* (2013.01); *C08G 18/7664* (2013.01); *C08J 5/24* (2013.01); *B29K 2075/00* (2013.01); *B29K 2105/25* (2013.01); *B29K 2511/00* (2013.01)

(58) Field of Classification Search
CPC ..... B29C 70/30; B29C 70/521; B29C 70/546; B29C 70/32; B29C 70/16; B29K 2075/00; B29K 2105/25; B29K 2511/00; C08G 18/5024; C08G 18/7664; C08G 18/36; C08G 18/482; C08J 5/24
See application file for complete search history.

(56) References Cited

U.S. PATENT DOCUMENTS

| | | |
|---|---|---|
| 4,876,050 A | 10/1989 | Horton |
| 5,087,193 A | 2/1992 | Herbert, Jr. |
| 5,332,606 A | 7/1994 | Pearce |
| 5,766,357 A | 6/1998 | Packer et al. |
| 6,179,945 B1 | 1/2001 | Greenwood et al. |
| 6,593,255 B1 | 7/2003 | Lawton et al. |
| 6,793,855 B2 | 9/2004 | Cheolas et al. |
| 7,014,803 B2 | 3/2006 | Perez et al. |

(Continued)

FOREIGN PATENT DOCUMENTS

| | | |
|---|---|---|
| WO | 2007062516 A1 | 6/2007 |
| WO | 2014209704 A1 | 12/2014 |

OTHER PUBLICATIONS

Huntman; JEFFOL® Polyether Polyols Product Line 2010.

*Primary Examiner* — Vishal I Patel
(74) *Attorney, Agent, or Firm* — Donald R. Palladino

(57) ABSTRACT

Disclosed are filament winding processes that use a low viscosity polyurethane-forming composition, systems for making a composites and the composites so made.

16 Claims, 4 Drawing Sheets

(56) References Cited

U.S. PATENT DOCUMENTS

| | | |
|---|---|---|
| 7,056,976 B2 | 6/2006 | Joshi et al. |
| 7,202,302 B2 | 4/2007 | Cheolas et al. |
| 7,413,623 B2 | 8/2008 | Raday |
| 7,507,361 B2 | 3/2009 | Joshi et al. |
| 2006/0177591 A1 | 8/2006 | Raday |
| 2007/0125487 A1* | 6/2007 | Elliott ................ B29C 53/8016 156/161 |
| 2008/0274319 A1 | 11/2008 | Berksoy et al. |
| 2009/0019816 A1 | 1/2009 | Lockwood et al. |
| 2009/0023870 A1 | 1/2009 | Berksoy et al. |

* cited by examiner

FILAMENT WINDING PROCESSES USING POLYURETHANE RESINS AND SYSTEMS FOR MAKING COMPOSITES

FIELD

The present invention is directed to, among other things, filament winding processes that use a low viscosity polyurethane-forming composition, systems for making a composite and the composites so made.

BACKGROUND

Filament winding is a process for the production of composites, often in the form of cylindrical structures. In this process, fiber rovings or filaments are coated with a resin as they are wrapped around a mold or mandrel to produce articles such as pipe, pressure bottles and tanks, storage containers, among other things. Filament winding is typically an open atmosphere process in which fibers are immersed in a bath of resin, wound around the mandrel and the mandrel is placed in an oven to cure the resin. Once the resin has cured, the mandrel is generally removed, leaving the hollow final product.

Resins which are typically used in filament winding processes include epoxies, polyesters, and vinyl-esters. Historically, polyurethanes have not generally been used in filament winding processes because polyurethane-forming systems react with water or moisture present in the air or in the winding fibers, unlike epoxies, polyesters and vinyl-esters. The reaction of polyurethane-forming systems with water produces undesirable foaming on the surface of the composite article being produced.

One method for limiting the reaction of water with the polyurethane-forming system is pre-drying the fibers to be used in producing the composite and then conditioning the fibers in a low humidity environment. This method, however, requires equipment that is quite expensive to install.

As a result, it would be desirable to provide filament winding processes and systems that use polyurethanes and that address at least some of these problems.

SUMMARY OF THE INVENTION

In certain respects, the present invention is directed to processes for making a composite. The processes comprise: a) impregnating a plurality of aligned continuous fibers by passing the aligned fibers through a channel having a polyurethane-forming composition disposed therein, wherein the aligned fibers are contacted with the composition as the fibers pass through the channel; and b) winding the aligned fibers coated thereby about a mandrel which pulls the aligned fibers through the channel. In such processes, the polyurethane-forming composition comprises a mixture of components comprising: (i) an isocyanate-functional component comprising an organic polyisocyanate, and (ii) an isocyanate-reactive component comprising: (A) at least 50% by weight, based on total weight of (ii), of an amine-initiated polyether polyol having a functionality of at least 3 and a number average molecular weight of from 100 gram/mole to 4000 gram/mole, and (B) 10 to 50% by weight, based on total weight of (ii), of a hydroxyl-functional hydrophobic vegetable oil or hydroxyl-functional hydrophobic modified vegetable oil, with the proviso that (1) the isocyanate-reactive component comprises no more than 10% by weight of a polyether polyol produced from an initiator other than an amine, based on the total weight of polyether polyol in the polyurethane-forming composition, or (2) the isocyanate-reactive component comprises no more than 35% by weight of a polyether polyol produced from an initiator other than an amine, based on the total weight of polyether polyol in the polyurethane-forming composition, and the isocyanate-reactive component comprises at least 5% by weight, based on the total weight of the isocyanate-reactive component of the polyurethane-forming composition, of a non-reactive hydrophobic oil.

In other respects, the present invention is directed to systems for making a composite. These systems comprise: (a) a source of a plurality of continuous fibers; (b) means for aligning the plurality of continuous fibers provided from the source; (c) a resin injection chamber comprising: (i) a fiber inlet configured to supply the plurality of aligned fibers to an interior of the chamber; (ii) a fiber outlet configured to withdraw the plurality of fibers from the chamber; (iii) a channel extending through the chamber from the inlet to the outlet, wherein the channel has a tapered vertical measurement, wherein the vertical measurement decreases in size along the fiber flow path through the channel; and (iv) a polyurethane-forming composition inlet configured to supply a polyurethane-forming composition to the channel, wherein the inlet comprises a center portion and at least at least two arms extending from the center portion at an angle of from 30° to 60°, such that the composition contacts all of the plurality of fibers in the channel, wherein the polyurethane-forming composition comprises a mixture of components comprising (A) an isocyanate-functional component comprising an organic polyisocyanate, and (B) an isocyanate-reactive component; and (d) a mandrel configured to form the composite by winding the plurality of fibers withdrawn from the chamber.

The present invention is also directed to, among other things, apparatuses for making a composite, compositions suitable for use in the processes for making a composite described herein, and composite articles produced using the processes, systems, and apparatuses described herein.

DETAILED DESCRIPTION

Figure 1:
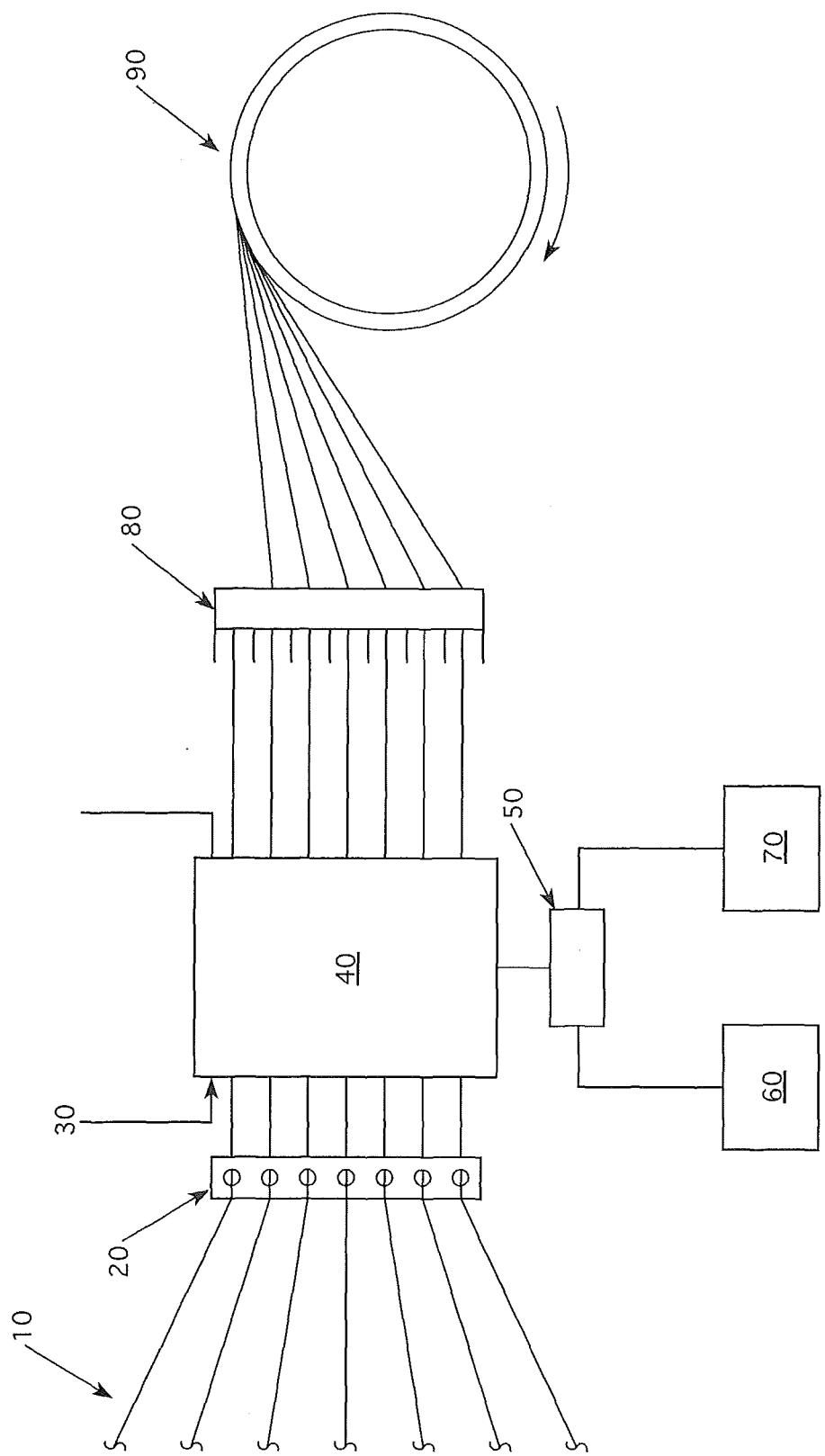
FIG. 1 is a schematic illustration of a system for making a composite according to certain embodiments of the present invention.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. §112 and 35 U.S.C. §132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the present invention are directed to processes for making a composite. The processes comprise: a) impregnating a plurality of aligned continuous fibers by passing the aligned fibers through a channel having a polyurethane-forming composition disposed therein, wherein the aligned fibers are contacted with the composition as the fibers pass through the channel; and b) winding the aligned fibers coated thereby about a mandrel which pulls the aligned fibers through the channel.

Fibers suitable for use in the present invention includes, for example, glass fibers, such as E glass or S glass fibers. Other suitable fiber materials include, but are not limited to, fibers constructed of boron, carbon, alumina, alumina and silica, silicon carbide, zirconia, alumina and zirconia, mullite, yttrium, among others, as well as combinations thereof.

In the processes of the present invention, the polyurethane-forming composition comprises a mixture of components. The mixture comprises: (i) an isocyanate-functional component comprising an organic polyisocyanate, and (ii) an isocyanate-reactive component. In certain embodiments, the polyurethane-forming composition is a low viscosity composition, which, as used herein, means that the composition has a viscosity, at 25° C., of no more than 1000 mPa·s, such as no more than 600 mPa·s or no more than 500 mPa·s and at least 100 mPa·s, such as at least 200 mPa·s, for at least 30 minutes after mixture of the isocyanate-functional component and the isocyanate-reactive component, such viscosity values being determined at 25° C. using a Brookfield DVE viscometer, spindle #6.

In certain embodiments, the isocyanate-functional component and the isocyanate-reactive component are mixed in amounts such that the NCO Index (i.e., the ratio of the total number of reactive isocyanate groups present to the total number of isocyanate-reactive groups that can react with the isocyanate under the conditions employed in the process multiplied by 100) is at least 90, such at least 99, or at least 100 and no more than 300, such as no more than 110 or, in some cases, no more than 105. In certain embodiments, the NCO index is 102.

The isocyanate-functional component comprises an organic polyisocyanate. As used herein, the term "isocyanate-functional" refers to the NCO functional group. As used herein, the term "polyisocyanate" refers to a compound having two or more isocyanate, i.e., NCO, groups per molecule. In certain embodiments, the isocyanate-functional component has a viscosity, at 25° C., of no more than 300 mPa·s, when measured using a Brookfield DVE viscometer as described above.

Organic polyisocyanates suitable for use in the polyurethane-forming compositions used in the present invention include, without limitation, butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomers of bis (isocyanatocyclohexyl)methane or a mixture of these with any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) or higher homologs of MDI (polymeric MDI), 1,3- and/or 1,4-bis(2-isocyanatoprop-2-yl)benzene (TMXDI), 1,3-bis(isocyanatomethyl)benzene (XDI), and 2,6-diisocyanatohexanoate (lysine diisocyanate) having $C_1$-$C_6$ alkyl groups. In certain embodiments, the isocyanate-functional component comprises a polymeric MDI (pMDI).

In certain embodiments, the isocyanate-functional component comprises a modified polyisocyanate, such as diisocyanate, having uretdione, isocyanurate, urethane, carbodiimide, uretonimine, allophanate, biuret, amide, iminooxadiazinedione and/or oxadiazinetrione structure. In certain embodiments, the isocyanate-functional component comprises a polyisocyanate having more than 2 NCO groups per molecule, non-limiting examples being 4-isocyanatomethyloctane 1,8-diisocyanate (nonane triisocyanate) and triphenylmethane 4,4', 4"-triisocyanate.

One example of a suitable polyisocyanate is that which is commercially available from Bayer MaterialScience LLC under the name Mondur® MRS 4 (a modified polymeric diphenylmethane diisocyanate prepolymer (pMDI) with a moderately high 2,4'-MDI isomer content, NCO content of 31.8-32.6 wt %, average NCO equivalent weight of 129, and viscosity at 25° C. of 30-50 mPa·s).

As indicated, in the processes of the present invention, the polyurethane-forming composition comprises a mixture of components comprising an isocyanate-reactive component. As used herein, the term "isocyanate-reactive" refers to functional groups that are reactive with isocyanate, i.e., NCO, groups, such as amine groups, thiol groups, and hydroxyl groups. As such, the term "isocyanate-reactive component", as used herein, means a composition comprising materials with functional groups that are reactive with isocyanate groups.

In certain embodiments of the polyurethane-forming composition used in processes of the present invention, the isocyanate-reactive component comprises at least 50% by weight, based on total weight of the isocyanate-reactive component, of an amine-initiated polyether polyol having a functionality of at least 3 and a number average molecular weight of from 100 grams/mole to 4000 grams/mol. The number average molecular weight values reported herein are determined by end group analysis, unless otherwise indicated.

As indicated, the polyurethane-forming composition used in the present invention comprises an amine-initiated polyether polyol having a functionality of at least 3, such as a tri-functional polyether polyol or "triol" and/or a tetra-functional polyether polyol. In certain embodiments, the polyurethane-forming composition used in the present invention comprises an amine-initiated polyether triol. In certain embodiments, the polyurethane-forming composition used in the present invention comprises at least 20% by weight, such as at least 30% percent by weight, at least 50% by weight, at least 80% by weight, at least 90% by weight, or, in some cases, 100% by weight, of an amine-initiated polyether triol, based on the total weight of amine-initiated polyether polyol in the composition. In certain embodiments, the polyurethane-forming composition used in the present invention comprises (1) a tri-functional polyether polyol, and (2) a tetra-functional polyether polyol, wherein the weight ratio of (1) to (2) in the composition is at least 1:2.

In certain embodiments, the polyurethane-forming composition used in the present invention comprises an amine-initiated polyether triol, as described above, that has a number average molecular weight of from 100 to 600, such as 130 to 500, 150 to 400, or 200 to 300. These triols generally have a viscosity at 25° C. of from 100 to 1500 mPa·s, such as 150 to 1000 mPa·s, wherein the viscosity values are determined as described above.

In certain embodiments, the polyurethane-forming composition used in the present invention comprises (i) an amine-initiated tetra-functional polyether polyol, as described above, that has a number average molecular weight of from 1000 to 4000, such as 2000 to 3000 or 3000 to 4000 and which has a viscosity at 25° C. of from 100 to 1500 mPa·s, such as 500 to 1000 mPa·s, wherein the viscosity values are determined as described above, and/or (ii) an amine-initiated tetra-functional polyether polyol, as described above, that has a number average molecular weight of from 100 to 600, such as 130 to 500, 150 to 400, or 200 to 300 and which has a viscosity at 25° C. of from 10000 to 50000 mPa·s, such as 20000 to 40000 mPa·s, wherein the viscosity values are determined as described above. In certain embodiments, the amine-initiated tetra-functional polyether polyol (i) described herein is present in an amount of at least 50% by weight, such as 50 to 100% by weight, 60 to 90% by weight, or, in some cases 75 to 85% by weight, based on the total weight of amine-initiated tetra-functional polyether polyol used in the polyurethane-forming composition and/or the amine-initiated tetra-functional polyether polyol (ii) described herein, when used, is present in an amount of 0.1 to 50% by weight, such as 10 to 30% by weight, or 15 to 25% by weight, based on the total weight of amine-initiated tetra-functional polyether polyol used in the polyurethane-forming composition.

In certain embodiments of polyurethane-forming compositions used in the present invention, at least some of the amine-initiated polyether polyol(s) have an overall renewables content of from 20 to 85%, such as 50 to 80%, or, in some cases, 65 to 75%.

The amine initiator used to produce the amine-initiated polyether polyols used in the polyurethane-forming composition used in the present invention may be selected from any of the amines known to be useful for this purpose, specific examples of which include, but are not limited to, toluene diamine, ethanol amine, ethylene diamine, and triethylene amine. The amine initiator is alkoxylated, generally with ethylene oxide and/or propylene oxide, although any of the known alkoxylating materials may be used, in accordance with techniques known to those skilled in the art, to produce the amine-initiated polyether polyol.

Suitable amine-initiated polyether polyols also include those utilizing renewable materials, such as those prepared from an amine-based adduct that is produced by reacting a diamine or polyamine with an alkylene oxide. This amine-based adduct is then reacted with a triglyceride and optionally, a polysaccharide compound like sucrose or sorbitol or a glycerol or a polyglycerol in the presence of an alkylene oxide and a catalyst. Methods for conducting such alkoxylation reactions are known in the art.

In certain embodiments, the amine-initiated polyether polyol production process is conducted at a temperature of from 100 to 150° C. The reaction vessel in which the polyol is produced will often be rated to hold at least 5 bar of pressure due to the need to contain the volatile alkylene oxide at the temperatures used to carry out the process.

In certain embodiments, the amine-based adduct used to produce certain embodiments of the amine-initiated polyether polyol is prepared by reacting an alkylene oxide with an amine having an amine functionality of at least 1, such as 2. In certain embodiments, the amine and alkylene oxide are reacted in amounts such that from 1 to 2 moles of alkylene oxide, such as 1.25 to 1.9 moles of alkylene oxide are present for each amine group. No added catalyst is required to carry out this initial reaction to form the amine-based adduct.

The amines useful in the production of the amine-based adduct have an average amine functionality of at least 1, such as from 2 to 3 or, in some cases, 2. Examples of suitable amines include: aromatic amines such as crude toluene diamine obtained by the nitration of toluene followed by reduction; 2,3-toluene diamine; 3,4-toluene diamine; 2,4-toluene diamine; 2,6-toluene diamine; and isomeric mixtures of toluene diamine; aniline; 4,4-methylene dianiline; methylene-bridged polyphenyl polyamines composed of isomers of methylene dianilines and triamines or polyamines of higher molecular weight prepared by methods known in the art; alkanol amines such as monoisopropanolamine, diisopropanolamine, monoethanolamine, diethanolamine organic amines such as ethylene diamine, diethylene triamine and the like; and Mannich reaction products of phenol or substituted phenols with alkanol amines and formaldehyde or paraformaldehyde. Mixtures of any of the above amines may also be used.

Examples of alkylene oxides useful in producing the amine-based adduct and useful in the reaction of the amine-based adduct with a triglyceride include, without limitation, ethylene oxide, propylene oxide, butylene oxide, and mixtures of any thereof. In certain embodiments, only ethylene oxide is used to produce the amine-based adduct. Ethylene oxide or propylene oxide or mixtures of ethylene oxide and propylene oxide are often included in the reaction of the amine-based adduct with the triglyceride.

The triglyceride(s) reacted with the amine-based adduct are often reacted in amounts such that the weight ratio of triglyceride to amine is from 3:1 to 12:1, such as from 4:1 to 10:1, or, in some cases, from 5:1 to 9:1.

Any naturally occurring plant oils, plant oil products, animal-derived fats or oils, synthetic triglycerides, heat or chemically treated triglycerides, modified triglycerides or epoxidized triglycerides may be used to produce the amine-initiated polyether polyols. Examples of suitable triglycerides include, but are not limited to, cashew oil, soybean oil, palm oil, palm kernel oil, castor oil, canola oil, high erucic acid content rapeseed oil, rapeseed oil, corn oil, jatropha oil, peanut oil, cottonseed oil, linseed oil, lard, tallow, bodied soybean oil, epoxidized soybean oil, camelina oil, lipids derived from algae, lesquerella oil, limnanthes (meadowfoam) oil and combinations of any thereof. In addition, it is possible to employ either crude or refined triglycerides in the polyol reaction process. In some embodiments, soybean oil (refined bleached de-odorized grade) is used.

A naturally occurring sugar (i.e., a carbohydrate having at least one saccharose group) such as sucrose or sorbitol may optionally be included in the reaction mixture containing the amine-based adduct and the triglyceride(s). Glycerol or polyglycerol (such as Diglycerol™ by Solvay Chemicals) may also be used in addition to or in place of a sugar.

When a sugar is included in the reaction mixture composed of the amine-based adduct, triglyceride and alkylene oxide, it is often included in an amount such that the molar ratio of sugar to triglyceride is from 0.01 to 0.64:1, such as from 0.2 to 0.35:1.

When a glycerol is included in the reaction mixture composed of the amine-based adduct, triglyceride and alkylene oxide, it is often included in an amount such that the molar ratio of glycerol to triglyceride is from 0.01 to 0.5:1, such as from 0.2 to 0.4:1.

When a combination of sugar and glycerol is included in the reaction mixture composed of the amine-based adduct, triglyceride and alkylene oxide, the total amount of sugar and glycerol is often included in an amount such that the molar ratio of sugar plus glycerol to triglyceride is from 0.01 to 0.55:1, such as from 0.2 to 0.44:1.

In principle, any alkaline material capable of catalyzing an epoxidation reaction may be used, particularly during the reaction of the amine adduct with the triglyceride in the presence of an alkylene oxide. Specific alkaline catalysts which are suitable include, but are not limited to, potassium hydroxide, sodium hydroxide, and amine catalysts such as imidazole or methyl-imidazole. When used, potassium hydroxide is often used in an amount that results in a concentration of from 0.05 to 0.5% after addition of the epoxide. It may be desirable that any potassium hydroxide remaining in the reaction mixture after completion of the reaction be neutralized to promote stability of the polyol and ensure consistent performance in the intended applications. The potassium hydroxide catalyst can be neutralized with, for example, sulfuric acid to form potassium sulfate, which can be removed from the product by filtration. Other suitable neutralizing agents include acetic acid and/or lactic acid, to form salts which remain soluble in the product and do not need to be removed.

The renewables content of the amine-initiated polyether polyol is calculated by a mass balance of the material charges to the reactor, followed by an assessment of the extent of the reaction by carrying out size exclusion chromatography of the reaction product. ASTM D6866 may be used to determine the bio-based carbon content of the product.

After the polyether polyol has been prepared, any residual catalyst remaining in the reaction mixture can be neutralized. Neutralization need not be exact neutrality (i.e., pH=7.0). The reaction mixture may be maintained at a slight acidity or alkalinity, i.e., at a pH of from 5 to 11, such as 6 to 10. It is sometimes desirable that any salt formed from the neutralized catalyst be soluble in the polyether polyol so that the product amine-initiated polyol may be used without subsequent treatment and without generating large amounts of solid waste material.

Examples of hydroxy carboxylic acids useful in neutralizing residual catalyst include, but are not limited to, lactic acid, salicylic acid, substituted salicylic acids, such as 2-hydroxy 3-methyl benzoic acid, 2-hydroxy 4-methyl benzoic acid and combinations of any of these acids.

As previously indicated, the polyurethane-forming compositions used in the present invention comprise, in certain embodiments, no more than 35% by weight, such as no more than 30% by weight, no more than 20% by weight, in some cases, no more than 10% by weight, such as no more than 5% by weight, no more than 2% by weight, or, in some cases, no more than 1% by weight, of a polyether polyol produced from an initiator other than an amine, based on the total weight of polyether polyols in the polyurethane-forming composition. More particularly, in some embodiments the isocyanate-reactive component comprises no more than 10% by weight of a polyether polyol produced from an initiator other than an amine, based on the total weight of polyether polyols in the polyurethane-forming composition. In some embodiments, the isocyanate-reactive component comprises no more than 35% by weight of a polyether polyol produced from an initiator other than an amine, based on the total weight of polyether polyols in the polyurethane-forming composition, and the isocyanate-reactive component comprises at least 5% by weight, based on the total weight of the isocyanate-reactive component of the polyurethane-forming composition, of a non-reactive hydrophobic oil.

In some embodiments, the polyurethane-forming compositions used in the present invention are substantially free of any polyether polyol produced from an initiator other than an amine, which, as used herein, means that no polyether polyol produced from an initiator other than an amine is intentionally included in the polyurethane-forming composition. In some embodiments, the polyurethane-forming compositions used in the present invention do not include any polyether polyol produced from an initiator other than an amine.

It has been surprisingly discovered that, when using polyurethane-forming compositions that comprise little or no polyether polyol produced from an initiator other than an amine, it was possible to provide a low viscosity composition that did not foam during a filament winding process, and which provided a cured part with acceptable physical properties within 20-30 minutes after production and without the need for a post cure period.

The polyurethane-forming composition used in the present invention comprise up to 50% by weight, such as up to 40% by weight or up to 30% by weight and/or at least 10% by weight or at least 20% by weight, based on total weight of the isocyanate-reactive component, of a hydroxyl-functional hydrophobic vegetable oil and/or hydroxyl-functional hydrophobic modified vegetable oil. The hydroxyl-functional hydrophobic vegetable oil or modified hydroxyl-functional hydrophobic vegetable oil may include, for example, sunflower, canola, linseed, cottonseed, tung, palm, poppy seed, corn, castor, cashew, peanut oil or any mixtures thereof. Derivatives and/or mixtures of derivatives of the mentioned oils may also be used, such as, for example, hydrogenated or non-hydrogenated castor oil, modified epoxidized oils (the modification consisting in opening the epoxy function to obtain a diol, such as hydroxylated modified soybean oil; and hydroxylated soybean oils (directly hydroxylated or epoxidized beforehand), such as those commercially available as Agrol® 2.0, 3.0 and 7.0, from by Bio-Based Technologies, LLC. In certain embodiments, the hydroxyl-functional hydrophobic vegetable oil and/or hydroxyl-functional hydrophobic modified vegetable oil comprises a cashew oil-based polyol, such as those having a viscosity at 25° C. of less than 9000 mPa·s, such as 500 to 4000 mPa·s cps or 500 to 2000 mPa·s, an OH number of 175 to 550, such as 175 to 340, 175 to 190, and a functionality of from 2 to 5, such as 3 to 5 or 4 to 5. Examples of suitable commercially available cashew oil-based polyols include: Polycard® XFN 50, XFN 100, XFN 150 M from Composites Technical Services of Kettering, Ohio.

In certain embodiments, the polyurethane-forming composition used in the present invention comprises a hydrophobic non-reactive diluent, such as a non-reactive hydrophobic oil, such as that commonly referred to as carbon black oil or light cycle oil (CAS #64741-59-9). Suitable non-reactive hydrophobic oils include aromatic oils, such as a mixture of 100% aromatic hydrocarbons, such as those commercially available under the trade name Viplex®, from Crowley Chemical Company. In certain embodiments, the non-reactive hydrophobic oil has a viscosity of less than 100, such as 10 to 50, or 20 to 50 Saybolt universal seconds at 100° F. (37.8° C.) measured according to ASTM D2161. In certain embodiments, the non-reactive hydrophobic oil is present in an amount of at least 1% by weight or at least 5% by weight and/or up to 20% by weight, up to 15% by weight, or, in some cases, up to 10% by weight, based on the total weight of the isocyanate-reactive component of the polyurethane-forming composition. In fact, it has been surprisingly discovered that the use of a non-reactive aromatic hydrocarbon oil, in an amount within the range described above, is especially effective in increasing the hydrophobic nature of the polyurethane-forming compositions described herein, such that significantly increased processing dew point temperatures can be used, as illustrated by the formation of parts at dew temperatures as high as 80° F. (26.7° C.) that have no foaming or surface bubble issues.

If desired, flow additives may optionally be included in the isocyanate-reactive component of the polyurethane-forming composition used in the present invention. Examples of suitable flow additives include, but are not limited to, those which are commercially available under the names BYK® 1790, BYK® 9076, TEGO® Foamex N, BYK® A530, BYK® 515, BYK® A 560, BYK® C-8000, BYK® 054, BYK® 067A, and BYK® 088.

One or more drying agents may optionally be included in the isocyanate-reactive component of the polyurethane-forming composition used in the present invention. Examples of suitable drying agents include, but are not limited to, those commercially available under the name INCOZOL, p-toluenesulfonyl isocyanate available from the OMG Group, powdered sieves, and calcium hydride.

The polyurethane-forming composition may also contain a catalyst for reaction of the isocyanate-functional component(s) with polyisocyanates. Catalyst(s), where used, is/are often introduced into the reaction mixture by pre-mixing with the isocyanate-reactive component. Suitable catalysts include, but are not limited to, tertiary amines, tertiary amine acid salts, organic metal salts, covalently bound organometallic compounds, and combinations thereof. The level of the catalyst required to achieve the needed reactivity profile will vary with the composition of the formulation. The catalysts often have at least some degree of solubility in the isocyanate-reactive component used, and, in some cases, are fully soluble in that component at the use levels required.

The polyurethane-forming system may contain other optional additives, if desired. Examples of additional optional additives include particulate or short fiber fillers, internal mold release agents, fire retardants, smoke suppressants, dyes, pigments, antistatic agents, plasticizers (such as 2,2,4-trimethyl-1,3-pentanediol diisobutyrate), lubricants, surfactants (such as silicone-based surfactants, such as Dow Corning® 1248 Fluid), solvents (such as propylene carbonate), antioxidants, UV stabilizers, de-aerators, minor amounts of viscosity reducing inert diluents, combinations of these, and any other known additives from the art. In some embodiments of the present invention, the additives or portions thereof may be provided to the fibers, such as by coating the fibers with the additive.

Other optional additives include moisture scavengers, such as molecular sieves; defoamers, such as polydimethylsiloxanes; coupling agents, such as the mono-oxirane or organo-amine functional trialkoxysilanes; combinations of these and the like. Fire retardants are sometimes desirable as additives, examples of which include, but are not limited to, triaryl phosphates; trialkyl phosphates, especially those bearing halogens; melamine (as filler); melamine resins (in minor amounts); halogenated paraffins and combinations thereof.

Dispersing aids which may be included in the composition include any material having lyophilic and lyophobic characteristics such as block copolymers. Examples of suitable dispersing aids that are commercially available include those available under the names BYK® 2155, BYK® 9076 and BYK® 9077.

As indicated, some embodiments of the present invention are directed to processes for making a composite that comprise: a) impregnating a plurality of aligned continuous fibers by passing the aligned fibers through a channel having a polyurethane-forming composition, such as that described above, disposed therein, wherein the aligned fibers are contacted with the composition as the fibers pass through the channel; and b) winding the aligned fibers coated thereby about a mandrel which pulls the aligned fibers through the channel. Certain embodiments of the present invention are directed to systems for making a composite by such a process that comprise: (a) a source of a plurality of continuous fibers; (b) means for aligning the plurality of continuous fibers provided from the source; (c) a resin injection chamber comprising: (i) a fiber inlet configured to supply the plurality of aligned fibers to an interior of the chamber; (ii) a fiber outlet configured to withdraw the plurality of fibers from the chamber; (iii) a channel extending through the chamber from the inlet to the outlet, wherein the channel has a tapered vertical measurement, wherein the vertical measurement decreases from the fiber inlet to the fiber outlet; and (iv) a polyurethane-forming composition inlet configured to supply a polyurethane-forming composition to the channel, wherein the inlet comprises a center portion and at least two arms extending from the center portion at, for example, an angle of from 30° to 60°, such that the composition contacts all of the plurality of fibers in the channel, wherein the polyurethane-forming composition comprises a mixture of components comprising (A) an isocyanate-functional component comprising an organic polyisocyanate, and (B) an isocyanate-reactive component; and (d) a mandrel configured to form the composite by winding the plurality of fibers withdrawn from the chamber.

Such processes and systems can be further understood with reference to the Figures. Referring now to FIG. 1, there is depicted a schematic illustration of a system for making a composite according to certain embodiments of the present invention. The system comprises a source (not shown) of a plurality of continuous fibers 10. The continuous fibers 10 can be glass fibers, such as E glass or S glass fibers. Other suitable fiber materials include, but are not limited to, fibers constructed of boron, carbon, alumina, alumina and silica, silicon carbide, zirconia, alumina and zirconia, mullite, yttrium, among others, as well as combinations thereof. As used herein, the term "continuous" when used with reference to continuous fibers, means that the length of the fiber is extremely high as compared to its diameter or width and is such that the fiber is spoolable. Continuous fibers are sometimes referred to as filaments, yarns, tows, rovings, ribbons, or tapes.

The systems of the present invention, in certain embodiments, comprise a first means for aligning the plurality of continuous fibers provided from the source, such as, for example, a guide plate 20 having one or more, such as at least 3, at least 4, at least 5, at least 6, or at least 7, apertures through which an individual continuous fibers 10 pass. Other suitable structures for aligning the plurality of continuous fibers include, for example, those having a rake or comb like configuration. In some embodiments, tension is exerted on the fibers as they pass the aligning means to assist in maintaining alignment of the fibers in the processes and systems of the present invention. For example, in some embodiments, tensioning arms, which can be disposed prior to the guide plate, are used to create of total load of 0.5 to 3.0 pounds on each fiber.

Figure 2:
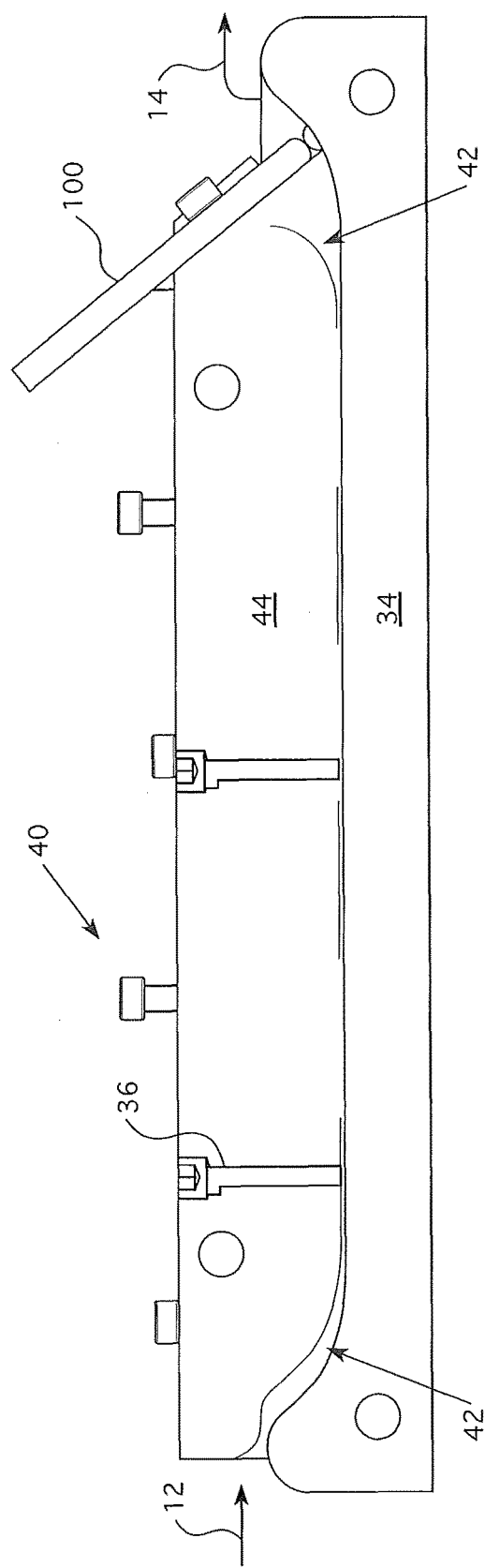
FIG. 2 is a cross-sectional cut-away view of an injection chamber according to certain embodiments of the present invention.

In addition, in embodiments of the systems of the present invention a resin injection chamber 40 is provided. As shown in FIG. 2, in certain embodiments, the injection chamber may be formed by connecting in an abutting relationship one side of a first, or forming, plate 44 with a side of another, lower (or second), plate 34, such as by one or more fasteners, such as screws. As such, the interior of the injection chamber 40, in which channel 42 is disposed, can be closed to the atmosphere. It is also seen that the resin injection chamber comprises: (i) a fiber inlet 12 configured to supply the plurality of aligned fibers to an interior of the chamber; (ii) a fiber outlet 14 configured to withdraw the plurality of fibers from the chamber; (iii) a channel 42 extending through the chamber from the inlet 12 to the outlet 14, wherein the channel 42 has a tapered vertical measurement, wherein the vertical measurement decreases in size along the fiber flow path through channel 42 until, in some embodiments, a predetermined location proximate to the outlet 14 and just prior to adjustable wiper plate 100. The tapered vertical measurement can be formed, for example, by virtue of an angled lower surface of the forming plate 44 and/or the configuration of a recessed portion 400 (see FIG. 5) of plate 34. For example, in some embodiments, the taper is such that the vertical measurement decreases from 0.070 inches at the inlet 12 to 0.040 inches along the fiber flow path through channel 42. Referring once again to FIG. 1, it is seen that the injection chamber 40 may include a coolant 30 flowing therethough, in order to control the temperature of the injection chamber at the desired level. In certain embodiments, the coolant 30 maintains a temperature within the injection chamber of 70 to 100° F. (21.1° C. to 37.8° C.), such as 75 to 85° F. (23.9° C. to 29.4° C.).

In the systems of the present invention, a polyurethane-forming composition inlet is configured to supply a polyurethane-forming composition to the channel 40 such that the composition contacts the plurality of fibers 10 in the channel, wherein the polyurethane-forming composition comprises a mixture of components comprising (A) an isocyanate-functional component comprising an organic polyisocyanate, and (B) an isocyanate-reactive component. As is seen in FIG. 1, a source of an isocyanate-functional compound 60 and a source of an isocyanate-reactive component 70 are mixed in a mix head 50, such as a static mixer, and then supplied to the chamber 40. As is seen in FIG. 2, in certain embodiments, after passing through the mix head 50, the polyurethane-forming composition is introduced to the chamber via feed line 36.

Referring once again to FIG. 1, it is seen that after the fibers 10 pass through the injection chamber 40 (in certain embodiments, the fibers 10 may pass by wiping device, such as an adjustable wiper blade, to remove excess resin from the fibers as they exit the chamber 40), they may, in certain embodiments, pass through a second means 80 for aligning the plurality of continuous fibers provided from the source, such as, for example, the comb-structured device depicted in FIG. 1. Other suitable structure for use as the second means for aligning the plurality of continuous fibers 10 include a guide plate, such as is described above. Thereafter, the fibers 10 are wound about a mandrel 90 that is configured to form the composite by winding the plurality of fibers 10 withdrawn from the chamber 40.

Figure 3:
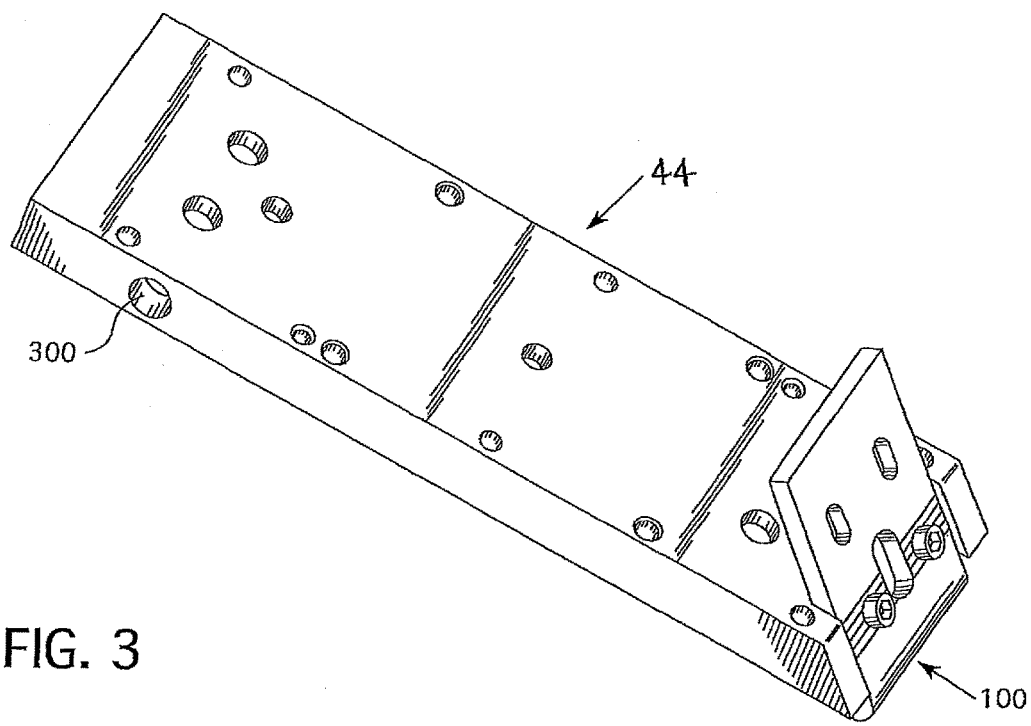
FIG. 3 is a perspective view of one side of the forming plate shown in FIG. 2.
Figure 4:
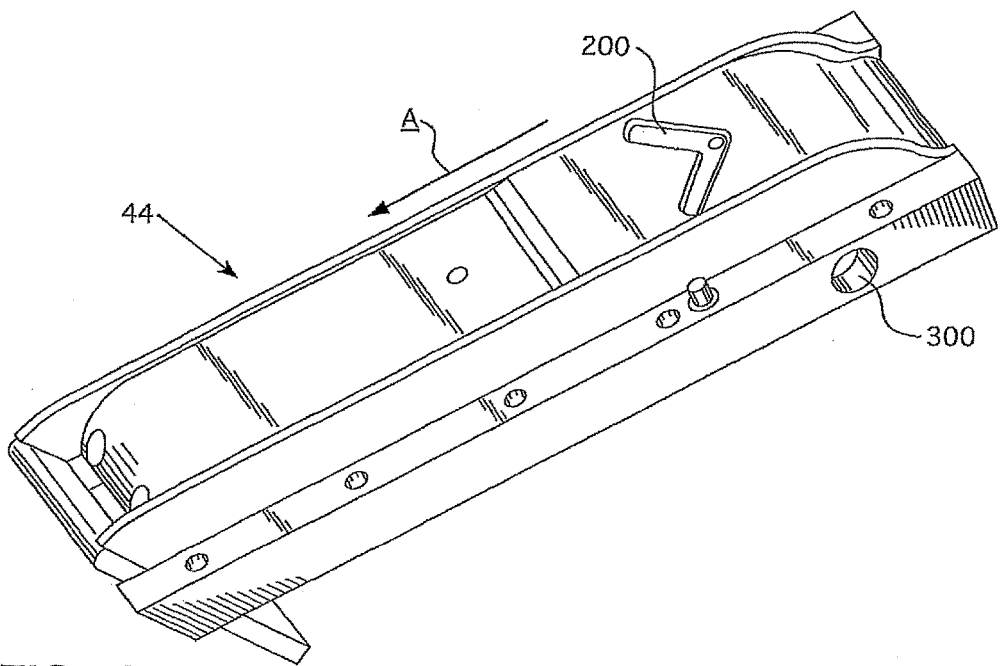
FIG. 4 is a perspective view of a second side of the forming plate shown in FIG. 2.

FIG. 3 is a perspective view of one side of forming plate 44 shown in FIG. 2. As is apparent, in this embodiment, forming plate 44 comprises a coolant, such as water, inlet 300 and an adjustable wiper plate 100. FIG. 4 is a perspective view of a second side of forming plate 44 of FIG. 2. As is apparent, in this embodiment, the second side of the forming plate 44 comprises a generally V-shaped resin polyurethane-forming composition inlet that has a center portion and two arms 200 extending from the center portion via which the polyurethane-forming composition enters the chamber 40 from feed line 36 and thereafter flows through the chamber 40 in the direction of arrow A.

Figure 5:
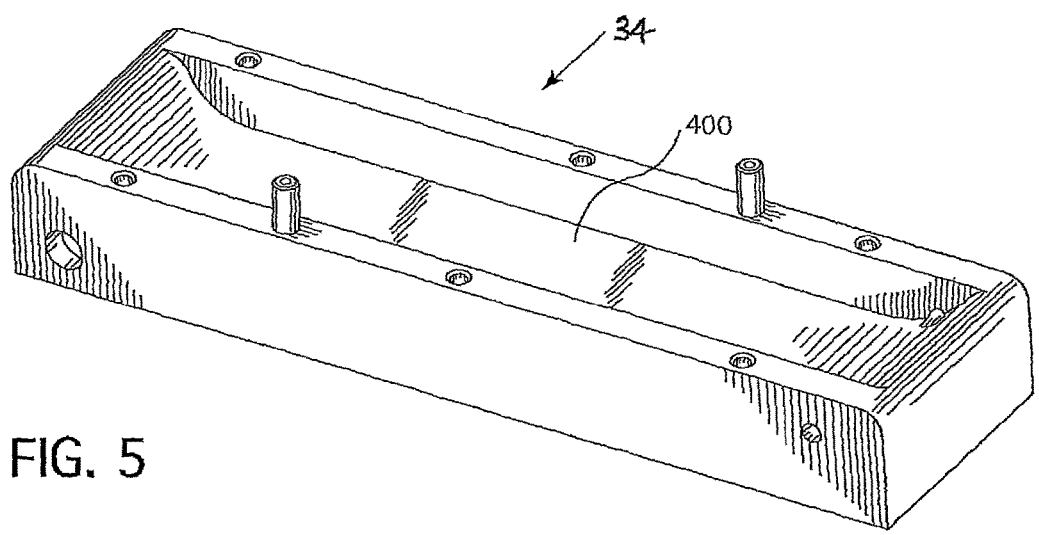
FIG. 5 is a perspective view of a first side of the lower plate shown in FIG. 2.
Figure 6:
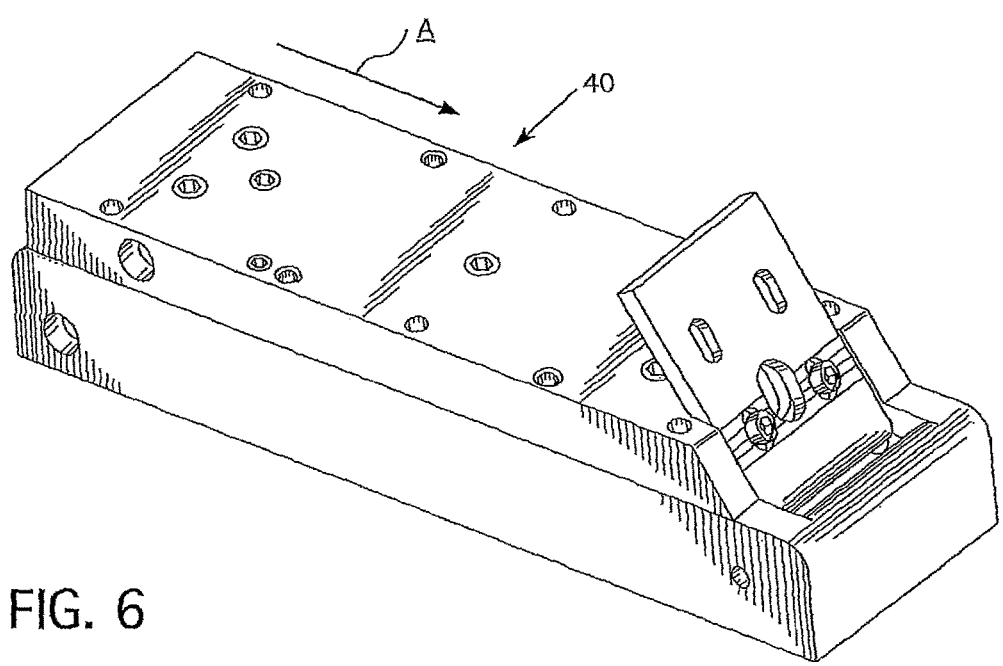
FIG. 6 is a perspective view of an injection chamber according to certain embodiments of the present invention in which a second side of the forming plate shown in FIG. 2 is in abutting relationship with a first side of the lower plate shown in FIG. 2.

FIG. 5 is a perspective view of a first side of lower plate 34 of FIG. 2. As is apparent, in this embodiment, the plate 34 includes a recessed portion 400 through which the fibers 10 pass to be impregnated with the polyurethane-forming composition. FIG. 6 is a perspective view of the injection chamber 40 according to certain embodiments of the present invention in which a second side of the plate 44 of the injection chamber 40 is in abutting relationship with a first side of a plate 34 of the injection chamber 40. As depicted, in this embodiment, the fibers 10 pass through the injection chamber in the direction of arrow A. As such, the fibers 10 pass through the recessed portion 400 to be impregnated with the polyurethane-forming composition. As the fibers 10 exit the chamber, they pass by adjustable wiper plate 100 which removes excess resinous material from the fibers 10.

Composites made using the processes and systems described herein include, but are not limited to, pipes, pressure bottles and tanks, storage containers, utility poles, among other things.

As will be appreciated by the foregoing description, the polyurethane-forming compositions described above are very hydrophobic and are not reactive to moisture contained in the atmosphere and/or found on the fibers. The filament winding process can be used without additional pre-drying of the fibers and or temperature/humidity controls to the process area. In addition, the hydrophobic nature of the polyurethane-forming compositions is enhanced by the addition of bio-based components from either castor, soy or other agricultural by products.

Certain embodiments of the present invention, therefore, are directed to processes for making a composite that comprise: a) impregnating a plurality of aligned continuous fibers by passing the aligned fibers through a channel having a polyurethane-forming composition disposed therein, wherein the aligned fibers are contacted with the composition as the fibers pass through the channel; and b) winding the aligned fibers coated thereby about a mandrel which pulls the aligned fibers through the channel. In such processes, the polyurethane-forming composition comprises a mixture of components comprising: (i) an isocyanate-functional component comprising an organic polyisocyanate, and (ii) an isocyanate-reactive component comprising: (A) at least 50% by weight, based on total weight of (ii), of an amine-initiated polyether polyol having a functionality of at least 3 and a number average molecular weight of from 100 gram/mole to 4000 gram/mole, and (B) 10 to 50% by weight, based on total weight of (ii), of a hydroxyl-functional hydrophobic vegetable oil or hydroxyl-functional hydrophobic modified vegetable oil, with the proviso that (1) the isocyanate-reactive component comprises no more than 10% by weight of a polyether polyol produced from an initiator other than an amine, based on the total weight of polyether polyols in the polyurethane-forming composition, or (2) the isocyanate-reactive component comprises no more than 35% by weight of a polyether polyol produced from an initiator other than an amine, based on the total weight of polyether polyols in the polyurethane-forming composition, and the isocyanate-reactive component comprises at least 5% by weight, based on the total weight of the isocyanate-reactive component of the polyurethane-forming composition, of a non-reactive hydrophobic oil.

Certain embodiments of the present invention are directed to a process of the previous paragraph, wherein the fibers include glass fibers, such as E glass or S glass fibers, or fibers constructed of boron, carbon, alumina, alumina and silica, silicon carbide, zirconia, alumina and zirconia, mullite, yttrium, among others, as well as combinations thereof.

Embodiments of the present invention are directed to a process of either of the previous two paragraphs, wherein the polyurethane-forming composition has a viscosity, at 25° C., of no more than 1000 mPa·s, such as no more than 600 mPa·s or no more than 500 mPa·s and at least 100 mPa·s, such as at least 200 mPa·s, for at least 30 minutes after mixture of the isocyanate-functional component and the isocyanate-reactive component.

In some embodiments, the present invention is directed to a process of any of the previous three paragraphs, wherein the isocyanate-functional component and the isocyanate-reactive component are mixed in amounts such that the NCO Index is at least 90, such at least 99, or at least 100 and no more than 300, such as no more than 110 or, in some cases, no more than 105. In certain of these embodiments, the NCO index is 102.

In certain embodiments, the present invention is directed to a process of any of the previous four paragraphs, wherein the isocyanate-functional component has a viscosity, at 25° C., of no more than 300 mPa·s.

In some embodiments, the present invention is directed to a process of any of the previous five paragraphs, wherein the polyisocyanate includes butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomers of bis(isocyanatocyclohexyl)methane or a mixture of these with any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) or higher homologs of MDI (polymeric MDI), 1,3- and/or 1,4-bis(2-isocyanatoprop-2-yl)benzene (TMXDI), 1,3-bis (isocyanatomethyl)benzene (XDI), and 2,6-diisocyanatohexanoate (lysine diisocyanate) having C1-C6 alkyl groups.

Some embodiments of the present invention are directed to a process of any of the previous six paragraphs, wherein the isocyanate-functional component comprises a modified polyisocyanate, such as diisocyanate, having uretdione, isocyanurate, urethane, carbodiimide, uretonimine, allophanate, biuret, amide, iminooxadiazinedione and/or oxadiazinetrione structure.

In some embodiments, the present invention is directed to a process of any of the previous seven paragraphs, wherein the polyisocyanate comprises a modified polymeric diphenylmethane diisocyanate prepolymer (pMDI) with a 2,4'-MDI isomer content, NCO content of 31.8-32.6 wt %, average NCO equivalent weight of 129, and viscosity at 25° C. of 30-50 mPa·s).

In some cases, the present invention is directed to a process of any of the previous eight paragraphs, wherein the polyurethane-forming composition comprises at least 20% by weight, such as at least 30% percent by weight, at least 50% by weight, at least 80% by weight, at least 90% by weight, or, in some cases, 100% by weight, of an amine-initiated polyether triol, based on the total weight of amine-initiated polyether polyol in the composition.

In certain embodiments, the present invention is directed to a process of any of the previous nine paragraphs, wherein the polyurethane-forming composition comprises (1) a tri-functional polyether polyol, and (2) a tetra-functional polyether polyol, wherein the weight ratio of (1) to (2) in the composition is at least 1:2.

In some embodiments, the present invention is directed to a process of any of the previous ten paragraphs, in which the polyurethane-forming composition comprises an amine-initiated polyether triol that has a number average molecular weight of from 100 to 600, such as 130 to 500, 150 to 400, or 200 to 300 and/or a viscosity at 25° C. of from 100 to 1500 mPa·s, such as 150 to 1000 mPa·s.

Some embodiments of the present invention are directed to a process of any of the previous eleven paragraphs, in which the polyurethane-forming composition comprises (i) an amine-initiated tetra-functional polyether polyol that has a number average molecular weight of from 1000 to 4000, such as 2000 to 3000 or 3000 to 4000 and/or which has a viscosity at 25° C. of from 100 to 1500 mPa·s, such as 500 to 1000 mPa·s, and/or (ii) an amine-initiated tetra-functional polyether polyol that has a number average molecular weight of from 100 to 600, such as 130 to 500, 150 to 400, or 200 to 300 and which has a viscosity at 25° C. of from 10000 to 50000 mPa·s, such as 20000 to 40000 mPa·s. In some of these embodiments, the amine-initiated tetra-functional polyether polyol (i) is present in an amount of at least 50% by weight, such as 50 to 100% by weight, 60 to 90% by weight, or, in some cases 75 to 85% by weight, based on the total weight of amine-initiated tetra-functional polyether polyol used in the polyurethane-forming composition and/or the amine-initiated tetra-functional polyether polyol (ii) described herein, when used, is present in an amount of 0.1 to 50% by weight, such as 10 to 30% by weight, or 15 to 25% by weight, based on the total weight of amine-initiated tetra-functional polyether polyol used in the polyurethane-forming composition.

In certain embodiments, the present invention is directed to a process of any of the previous twelve paragraphs, wherein in the polyurethane-forming composition used, at least some of the amine-initiated polyether polyol has an overall renewables content of from 20 to 85%, such as 50 to 80%, or, in some cases, 65 to 75%.

Some embodiments of the present invention are directed to a process of any of the previous thirteen paragraphs, wherein the polyurethane-forming composition comprises no more than 35% by weight, such as no more than 30% by weight, no more than 20% by weight, in some cases, no more than 10% by weight, such as no more than 5% by weight, no more than 2% by weight, or, in some cases, no more than 1% by weight, of a polyether polyol produced from an initiator other than an amine, based on the total weight of polyether polyols in the polyurethane-forming composition.

Certain embodiments of the present invention are directed to a process of any of the previous fourteen paragraphs, in which the polyurethane-forming composition comprises up to 50% by weight, such as up to 40% by weight or up to 30% by weight and/or at least 10% by weight or at least 20% by weight, based on total weight of the isocyanate-reactive component, of a hydroxyl-functional hydrophobic vegetable oil and/or hydroxyl-functional hydrophobic modified vegetable oil, such as, for example, sunflower, canola, linseed, cottonseed, tung, palm, poppy seed, corn, castor, cashew, peanut oil or any mixtures thereof. In some of these embodiments, the hydroxyl-functional hydrophobic vegetable oil and/or hydroxyl-functional hydrophobic modified vegetable oil comprises hydrogenated or non-hydrogenated castor oil, a modified epoxidized oil, a hydroxylated soybean oil, and/or a cashew oil-based polyol, such as those cashew oil-based polyols having a viscosity at 25° C. of less than 9000 mPa·s, such as 500 to 4000 mPa·s cps or 500 to 2000 mPa·s, an OH number of 175 to 550, such as 175 to 340, 175 to 190, and a functionality of from 2 to 5, such as 3 to 5 or 4 to 5.

In some embodiments, the present invention is directed to a process of any of the previous fifteen paragraphs, wherein the polyurethane-forming composition comprises a hydrophobic non-reactive diluent, such as a non-reactive hydrophobic oil, such as carbon black oil or light cycle oil, such as those having a viscosity of less than 100, such as 10 to 50, or 20 to 50 Saybolt universal seconds at 100° F. (37.8° C.) measured according to ASTM D2161. In certain of these embodiments, the non-reactive hydrophobic oil is present in an amount of at least 1% by weight or at least 5% by weight and/or up to 20% by weight, up to 15% by weight, or, in some cases, up to 10% by weight, based on the total weight of the isocyanate-reactive component of the polyurethane-forming composition.

In other respects, the present invention is directed to systems for making a composite. These systems comprise: (a) a source of a plurality of continuous fibers; (b) means for aligning the plurality of continuous fibers provided from the source; (c) a resin injection chamber comprising: (i) a fiber inlet configured to supply the plurality of aligned fibers to an interior of the chamber; (ii) a fiber outlet configured to withdraw the plurality of fibers from the chamber; (iii) a channel extending through the chamber from the inlet to the outlet, wherein the channel has a tapered vertical measurement, wherein the vertical measurement decreases in size along the fiber flow path through the channel; and (iv) a polyurethane-forming composition inlet configured to supply a polyurethane-forming composition to the channel, wherein the inlet comprises a center portion and at least at least two arms extending from the center portion such that the composition contacts all of the plurality of fibers in the channel, wherein the polyurethane-forming composition comprises a mixture of components comprising (A) an isocyanate-functional component comprising an organic polyisocyanate, and (B) an isocyanate-reactive component; and (d) a mandrel configured to form the composite by winding the plurality of fibers withdrawn from the chamber.

In some embodiments, the present invention is directed to a system of the previous paragraph, wherein the arms extend from the center portion at an angle of at an angle of from 30° to 60°.

In certain embodiments, the present invention is directed to a system of either of the previous two paragraphs, wherein the chamber comprises the connection in an abutting relationship one side of a first plate with a side of a second plate.

In other embodiments, the present invention is directed to a system of any of the previous three paragraphs, comprising a V-shaped resin polyurethane-forming composition inlet.

Some embodiments of the present invention are directed to a system of any of the previous four paragraphs, wherein the second plate comprises a recessed portion through which the fibers pass to be impregnated with the polyurethane-forming composition.

In some embodiments, the present invention is directed to a system of any of the previous five paragraphs, wherein the chamber comprises a wiper plate which removes excess resinous material from the fibers as they exit the chamber.

In certain embodiments, the present invention is directed to a system of any of the previous six paragraphs, wherein the polyurethane-forming composition comprises an isocyanate-reactive component comprising: (A) at least 50% by weight, based on total weight of (ii), of an amine-initiated polyether polyol having a functionality of at least 3 and a number average molecular weight of from 100 gram/mole to 4000 gram/mole, and (B) 10 to 50% by weight, based on total weight of (ii), of a hydroxyl-functional hydrophobic vegetable oil or hydroxyl-functional hydrophobic modified vegetable oil, with the proviso that: (1) the isocyanate-reactive component comprises no more than 10% by weight of a polyether polyol produced from an initiator other than an amine, based on the total weight of polyether polyols in the polyurethane-forming composition, or (2) the isocyanate-reactive component comprises no more than 35% by weight of a polyether polyol produced from an initiator other than an amine, based on the total weight of polyether polyols in the polyurethane-forming composition, and the isocyanate-reactive component comprises at least 5% by weight, based on the total weight of the isocyanate-reactive component of the polyurethane-forming composition, of a non-reactive hydrophobic oil.

In some embodiments, the present invention is directed to a system of any of the previous seven paragraphs, wherein at least some of the amine-initiated polyether polyol has an overall renewables content of from 20% to 85%.

In other embodiments, the present invention is directed to a system of any of the previous eight paragraphs, wherein the isocyanate-reactive component comprises no more than 10% by weight of a polyether polyol produced from an initiator other than an amine, based on the total weight of polyether polyols in the polyurethane-forming composition.

In some embodiments, the present invention is directed to a system of any of the previous nine paragraphs, wherein the hydroxyl-functional hydrophobic vegetable oil comprises a cashew oil-based polyol having a viscosity at 25° C. of less than 9000 mPa·s, an OH number of 175 to 550, and a functionality of from 2 to 5.

In still other embodiments, the present invention is directed to a system of any of the previous ten paragraphs, wherein the polyurethane-forming composition comprises a non-reactive hydrophobic oil having a viscosity of 10 to 50 Saybolt universal seconds at 37.8° C. measured according to ASTM D2161.

In yet other embodiments, the present invention is directed to a system of any of the previous eleven paragraphs, wherein the non-reactive hydrophobic oil is present in an amount of at least 5% by weight and up to 20% by weight, based on the total weight of the isocyanate-reactive component of the polyurethane-forming composition.

The non-limiting and non-exhaustive examples that follow are intended to further describe various non-limiting and non-exhaustive embodiments without restricting the scope of the embodiments described in this specification.

EXAMPLES

Example 1 (Comparative)

Polyurethane-forming compositions were prepared using the ingredients and amounts (in parts by weight) listed in Table 1. The ingredients of the Isocyanate-Reactive Component were blended using a standard mixer. The Isocyanate-Reactive Component and the Isocyanate-Functional Component were then loaded into a degassing chamber and degassed for 5-10 minutes at ambient temperature with a minimum of 27 inches Hg vacuum. The components were then moved to a variable ratio two-component low-pressure metering unit to meter the components through a static mixer to the inlet port of a resin injection chamber having a structure as depicted in the FIGS. 2-6. The mix ratios are set forth in Table 1 and were obtained adjusting the pumps for each component. Coolant was flowed through the resin injection chamber to maintain the bath temperature at 90-100° F. (32.2-37.8° C.).

A system as generally depicted in FIG. 1 was used to make composites. The number of rovings used was determined based on the desired part size and speed of manufacturing. Glass rovings were fed to the inlet of the resin injection chamber via tensioners and a heater box. The glass tension was 1.5 to 2.5 pounds per roving. At conclusion of each wind, the resin injection chamber was flushed with solvent and air to clean out the chamber and glass fibers were pulled through to clean out the chamber for the next wind.

The formulations shown all resulted in significant foaming on the part. In addition the cure on these systems was quite slow and a post cure was needed to hasten the cure.

TABLE 1

| Ingredients | Example 1A | Example 1B |
| --- | --- | --- |
| Isocyanate-Reactive Component ("R") | | |
| MULTRANOL ® 9133[1] | 25 | 18 |
| MULTRANOL ® 4011[2] | 13 | 32 |
| HYPERLITE ® E-824[3] | 35 | — |
| ARCOL ® PPG-425[4] | 27 | — |
| DB ® Castor Oil[5] | — | 50 |
| BAYLITH ® L[6] | 3 | 3 |
| COLORMATCH ® DR 0217[7] | 3 | 3 |
| BYK ® 3155[8] | 1 | 1 |
| DOW CORNING ® 1248 FLUID[9] | 1 | 1 |
| Isocyanate-Functional Component ("I") | | |
| MONDUR ® MRS 4[10] | 100 | 100 |
| Mix Ratio by weight I/R | 116/100 | 124/100 |
| Winding Results | Foaming | Foaming |
| Dew Point (° F./° C.) | 45/7.2 | 45/7.2 |
| Gel Time (minutes) | 45 | 45 |

[1]A 160-molecular weight polypropylene oxide-based triol that is non-amine initiated, OH # of 1035-1065 mg KOH/g, viscosity at 25° C. of 1200-1500 mPa · s (falling ball viscosity method) from Bayer MaterialScience LLC.
[2]A 300-molecular weight polypropylene oxide-based triol that is non-amine initiated, OH # of 530-570 mg KOH/g, viscosity at 25° C. of 1400-1900 mPa · s from Bayer MaterialScience LLC.
[3]A 5,000-molecular weight polyoxyalkylene polyol that is non-amine initiated, OH # of 34.1-37.3 mg KOH/g from Bayer MaterialScience LLC.
[4]A 425-molecular weight polypropylene glycol that is non-amine initiated, OH # of 250-276 mg KOH/g, viscosity at 25° C. of 70 mPa · s from Bayer MaterialScience LLC.
[5]Castor oil from Vertellus Performance Materials, Inc.
[6]Molecular sieve paste, Bayer MaterialScience LLC
[7]Pigment dispersion, Chromaflo Technologies
[8]Silicone-free polymer-based air release additive, BYK-Chemie GmbH.
[9]Silicone glycol graft copolymer with secondary hydroxyl functionality, Dow Corning Corporation
[10]Polymeric diphenylmethane-diisocyanate (pMDI) with a moderately high 2,4'-MDI isomer content, NCO content of 31.8-32.6 wt %, average NCO equivalent weight of 129, and viscosity at 25° C. of 30-50 mPa · s, from Bayer MaterialScience LLC.

Example 2

Polyurethane-forming compositions were prepared, using the ingredients and amounts (in parts by weight) listed in Table 2. The compositions were prepared and applied to glass fibers in the same manner as described in Example 1.

Results are also set forth in Table 2. As is seen, the all-amine based polyether polyol formulations yielded a dramatic improvement in foaming tendency using the same winding process. Various natural based polyols such as, castor oil, soy based polyols, and polyols based on cashew oil maintained the non-foaming nature of the winding system as long as formulated with amine based polyols.

TABLE 2

| Ingredients | Comparative Example 2A | Example 2B | Example 2C | Example 2D | Example 2E |
|---|---|---|---|---|---|
| *Isocyanate-Reactive Component ("R")* | | | | | |
| MULTRANOL ® 9133[1] | 18 | — | — | — | — |
| MULTRANOL ® 4011[2] | 14 | — | — | — | — |
| MULTRANOL ® 9181[11] | — | 10 | — | — | — |
| MULTRANOL ® 9138[12] | 25 | 35 | 60 | 60 | 60 |
| MULTRANOL ® 9168[13] | — | 50 | — | — | — |
| DB ® Castor Oil[5] | 40 | 35 | 40 | — | — |
| Agrol ® 2.0[14] | — | — | — | — | 40 |
| Polycard XFN ™ 50[15] | — | — | — | 40 | — |
| BAYLITH ® L[6] | 3 | 3 | 3 | 3 | 3 |
| COLORMATCH ® DR 0217[7] | 3 | 3 | 3 | 3 | 3 |
| BYK ® 3155[8] | 1 | 1 | 1 | 1 | 1 |
| DOW CORNING ® 1248 FLUID[9] | 1 | 1 | 1 | 1 | 1 |
| *Isocyanate-Functional Component ("I")* | | | | | |
| MONDUR ® MRS 4[10] | 100 | 100 | 100 | 100 | 100 |
| Mix Ratio by weight I/R | 145/100 | 85/100 | 100/100 | 100/100 | 100/100 |
| Winding Results | Foaming | No Foaming | No Foaming | No Foaming | No Foaming |
| Dew Point (° F./° C.) | 45/7.2 | 45/7.2 | 45/7.2 | 45/7.2 | 45/7.2 |
| Gel Time (minutes) | 8 | 3 | 3 | 3 | 3 |

[11] A 290-molecular weight tetrafunctional amine-based polyether polyol, OH # of 750-790 mg KOH/g, Bayer MaterialScience LLC.
[12] A 240-molecular weight amine-based polyether triol, OH # of 685-715 mg KOH/g and viscosity at 25° C. of 640-930 mPa · s, Bayer MaterialScience LLC.
[13] A 240-molecular weight amine-based polyether triol, OH # of 57-63 mg KOH/g and viscosity at 25° C. of 590-7600 mPa · s (falling ball method), Bayer MaterialScience LLC.
[14] Soy-based polyol (99% bio-based content according to ASTM D6866) derived from purified soybean oil, OH# 65-75 mg KOH/g, viscosity at 25° C. of 233 mPa · s, estimated functionality (equivalents OH/mole) of 1.7, BioBased Technologies
[15] Multfunctional polyol from cashew shell oil, (95% bio-based content), OH# 175-190 mg KOH/g, viscosity at 25° C. of 900 to 2000 mPa · s, functionality (equivalents OH/mole) of 4-5, Composite Technical Services Example 3

Polyurethane-forming compositions were prepared using the ingredients and amounts (in parts by weight) listed in Table 3. The compositions were prepared and applied to glass fibers in the same manner as described in Example 1.

Results are also set forth in Table 3. As is seen, the inclusion of an aromatic hydrocarbon oil increased the processing dew point temperature significantly as shown by parts wound at dew point temperatures as high as 80° F. (26.7° C.) that had no foaming/surface bubble issues.

TABLE 3

| Ingredient | Ex. 3A | Ex. 3B | Ex. 3C | Ex. 3D | Ex. 3E | Ex. 3F |
|---|---|---|---|---|---|---|
| *Isocyanate-Reactive Component ("R")* | | | | | | |
| MULTRANOL ® 9138[12] | 50 | 50 | 50 | 50 | 50 | 50 |
| Castor Oil #1 | 40 | 40 | 40 | 40 | 40 | 40 |
| Propylene Carbonate | 10 | 10 | — | — | — | — |
| Viplex ® 1700[16] | — | — | — | 10 | 10 | 10 |
| TXIB[17] | — | — | 10 | — | — | — |
| Baylith Blend[6] | 3 | 3 | 3 | 3 | 3 | 3 |
| Niax ™ A-575[18] | .1 | .1 | .1 | .1 | .1 | .1 |
| Polycat ® SA-1[19] | .25 | .25 | .25 | .25 | .25 | .25 |
| COLORMATCH ® DR 0217[7] | 3 | 3 | 3 | 3 | 3 | 3 |
| BYK ® 3155[8] | 1 | 1 | 1 | 1 | 1 | 1 |
| DOW CORNING ® 1248 FLUID[9] | 1 | 1 | 1 | 1 | 1 | 1 |
| *Isocyanate-Functional Component ("I")* | | | | | | |
| MONDUR ® MRS 4[10] | 100 | 100 | 100 | 100 | 100 | 100 |
| Mix Ratio by weight I/R | 100/100 | 100/100 | 100/100 | 100/100 | 100/100 | 100/100 |
| Winding Results | No Foaming | Foaming | No Foaming | No Foaming | No Foaming | No Foaming |
| Dew Point (° F./° C.) | 36/2.2 | 68/20 | 45/7.2 | 54/12.2 | 65/18.3 | 80/26.7 |
| Gel Time (minutes) | 3 | 3 | 3 | 3 | 3 | 3 |

[16] A hydrophobic aromatic oil from Crowley Chemical Company.
[17] 2,2,4-trimethyl-1,3-pentanediol diisobutyrate
[18] A delayed action amine catalyst from Momentive Performance Materials Inc.
[19] A heat-activated, delayed-action polyurethane catalyst based on 1,5-diaza-bicyclo (5.4.0) undec-5-ene, Air Products & Chemicals, Inc.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. §112, first paragraph, and 35 U.S.C. §132(a).

What is claimed is:

1. A process for making a composite, comprising:
   a) impregnating a plurality of aligned continuous fibers, by passing the aligned fibers through a channel having a polyurethane-forming composition disposed therein, wherein the aligned fibers are contacted with the composition as the fibers pass through the channel; and
   b) winding the impregnated aligned fibers about a mandrel which pulls the aligned fibers through the channel,
   wherein the polyurethane-forming composition comprises a mixture of components comprising:
   (i) an isocyanate-functional component comprising an organic polyisocyanate, and (ii) an isocyanate-reactive component comprising:
   (A) at least 50% by weight, based on total weight of (ii), of an amine-initiated polyether polyol having a functionality of at least 3 and a number average molecular weight of from 100 gram/mole to 4000 gram/mole, and
   (B) 10 to 50% by weight, based on total weight of (ii), of a hydroxyl-functional hydrophobic vegetable oil or hydroxyl-functional hydrophobic modified vegetable oil,
   with the proviso that:
   (1) the isocyanate-reactive component comprises no more than 10% by weight of a polyether polyol produced from an initiator other than an amine, based on the total weight of polyether polyol in the polyurethane-forming composition,
   or
   (2) the isocyanate-reactive component comprises no more than 35% by weight of a polyether polyol produced from an initiator other than an amine, based on the total weight of polyether polyol in the polyurethane-forming composition, and the isocyanate-reactive component comprises at least 5% by weight, based on the total weight of the isocyanate-reactive component of the polyurethane-forming composition, of a non-reactive hydrophobic oil.

2. The process of claim 1, wherein the polyurethane-forming composition has a viscosity, at 25° C. of no more than 1000 mPa·s for at least 30 minutes after mixture of the isocyanate-functional component and the isocyanate-reactive component.

3. The process of claim 1, wherein the isocyanate-functional component and the isocyanate-reactive component are mixed in amounts such that the NCO Index is at least 90.

4. The process of claim 1, wherein the isocyanate-functional component comprises a modified polymeric diphenylmethane diisoceyanate prepolymer.

5. The process of claim 4, wherein the a modified polymeric diphenylmethane diisocyanate prepolymer has an NCO content of 31.8-32.6 wt % and a viscosity at 25° C. of 30-50 mPa·s.

6. The process of claim 1, wherein the amine-initiated polyether polyol having a functionality of at least 3 comprises a tri-functional polyether polyol and/or a tetra-functional polyether polyol.

7. The process of claim 6, wherein the polyurethane-forming composition comprises at least 50% by weight of an amine-initiated polyether triol, based on the total weight of amine-initiated polyether polyol in the composition.

8. The process of claim 6, wherein the polyurethane-forming composition comprises:
   (1) a tri-functional polyether polyol, and
   (2) a tetra-functional polyether polyol,
   wherein the weight ratio of (1) to (2) in the composition is at least 1:2.

9. The process of claim 6, wherein the polyurethane-forming, composition comprises
   (1) an amine-initiated tetra-functional polyether polyol that has a number average molecular weight of from 1000 to 4000, and/or
   (2) an amine-initiated tetra-functional polyether polyol that has a number average molecular weight of from 100 to 600.

10. The process of claim 9, wherein (1) is present in an amount of 75 to 85% by weight, based on the total weight of amine-initiated tetra-functional polyether polyol used in the polyurethane-forming composition, and (2) is present in an amount of 15 to 25% by weight, based on the total weight of amino-initiated tetra-functional polyether polyol used the polyurethane-forming composition.

11. the process of claim 1, wherein at least some of the amine-initiated polyether polyol has an overall renewables content of from 20% to 85%.

12. A process for making a composite, comprising:
   a) impregnating a plurality of aligned continuous fibers by passing the aligned fibers through a channel having a polyurethane-forming composition disposed therein, wherein the aligned fibers are contacted with the composition as the fibers pass through the channel; and
   b) winding the impregnated aligned fibers about a mandrel which pulls the aligned fibers through the channel,
   wherein the polyurethane-forming composition comprises a mixture of components comprising:
   (i) an isocyanate-functional component comprising an organic polyisocyanate, and ii) an isocyanate-reactive component comprising:
   (A) at least 50% by weight, based on total weight of (ii), of an amine-initiated polyether polyol having a functionally of at least 3 and a number average molecular weight of from 100 gram/mole to 4000 gram/mole, and
   (B) 10 to 50% by weight, based on total weight of (ii), of a hydroxyl-functional hydrophobic vegetable oil or hydroxyl-functional hydrophobic modified vegetable oil,
   with the proviso that the isocyanate-reactive component comprises no more than 10% by weight of a polyether polyol produced from an initiator other than an amine, based on the total weight of polyether polyols in the polyurethane-forming composition.

13. The process of claim 1, wherein the hydroxyl-functional hydrophobic vegetable oil and/or hydroxyl-functional hydrophobic modified vegetable oil comprises castor oil, a hydroxylated soybean oil and/or a cashew oil-based polyol.

14. The process of claim 13, wherein the hydroxyl-functional hydrophobic vegetable oil comprises a cashew oil-based polyol having a viscosity at 25° C. of less than 9000 mPa·s, an OH number of 175 to 550, and a functionality of from 2 to 5.

15. The process of claim 1, wherein the polyurethane-forming composition comprises a non-reactive hydrophobic oil having a viscosity of 10 to 50 Saybolt universal seconds at 37.8° C. measured according to ASTM D2161.

16. The process of claim 15, wherein the non-reactive hydrophobic oil is present in an amount of at least 5% by weight and up to 20% by weight, based on the total weight of the isocyanate-reactive component of the polyurethane-forming composition.

* * * * *